United States Patent [19]
Inaga

[11] 3,934,840
[45] Jan. 27, 1976

[54] REEL ASSEMBLY
[75] Inventor: Katsu Inaga, Tokyo, Japan
[73] Assignee: Sony Corporation, Tokyo, Japan
[22] Filed: June 3, 1974
[21] Appl. No.: 476,091

[30] Foreign Application Priority Data
June 5, 1973 Japan.......................... 48-66880[U]

[52] U.S. Cl................................. 242/195; 226/92
[51] Int. Cl.².................... G03B 1/04; G11B 15/32
[58] Field of Search........ 242/195, 200; 226/91, 92; 244/153 R

[56] References Cited
UNITED STATES PATENTS

| | | | |
|---|---|---|---|
| 2,477,010 | 7/1949 | Schmidt............................ | 242/71.8 |
| 2,519,594 | 8/1950 | Ohland............................ | 244/153 R |
| 3,119,574 | 1/1964 | Laa.................................... | 242/195 |
| 3,136,464 | 6/1964 | Schmid............................. | 242/195 |
| 3,664,607 | 5/1972 | Trefzger et al. .................... | 242/195 |

Primary Examiner—Leonard D. Christian
Attorney, Agent, or Firm—Lewis H. Eslinger; Alvin Sinderbrand

[57] ABSTRACT

A reel assembly includes a flexible tape drawing member with a required length, a connecting means connected to the top end of the flexible tape drawing member and a reel hub with at least one cut-out portion. Another tape-like member is connected to the flexible tape drawing member through the connecting means. When the flexible tape drawing member and the tape-like member are wound around the reel hub on the automatic loading operation of a VTR or tape recorder, the connecting means is led into the cut-out portion. Therefore, the tape-like member can be orderly wound in circle around the reel hub without wrinkling.

4 Claims, 31 Drawing Figures

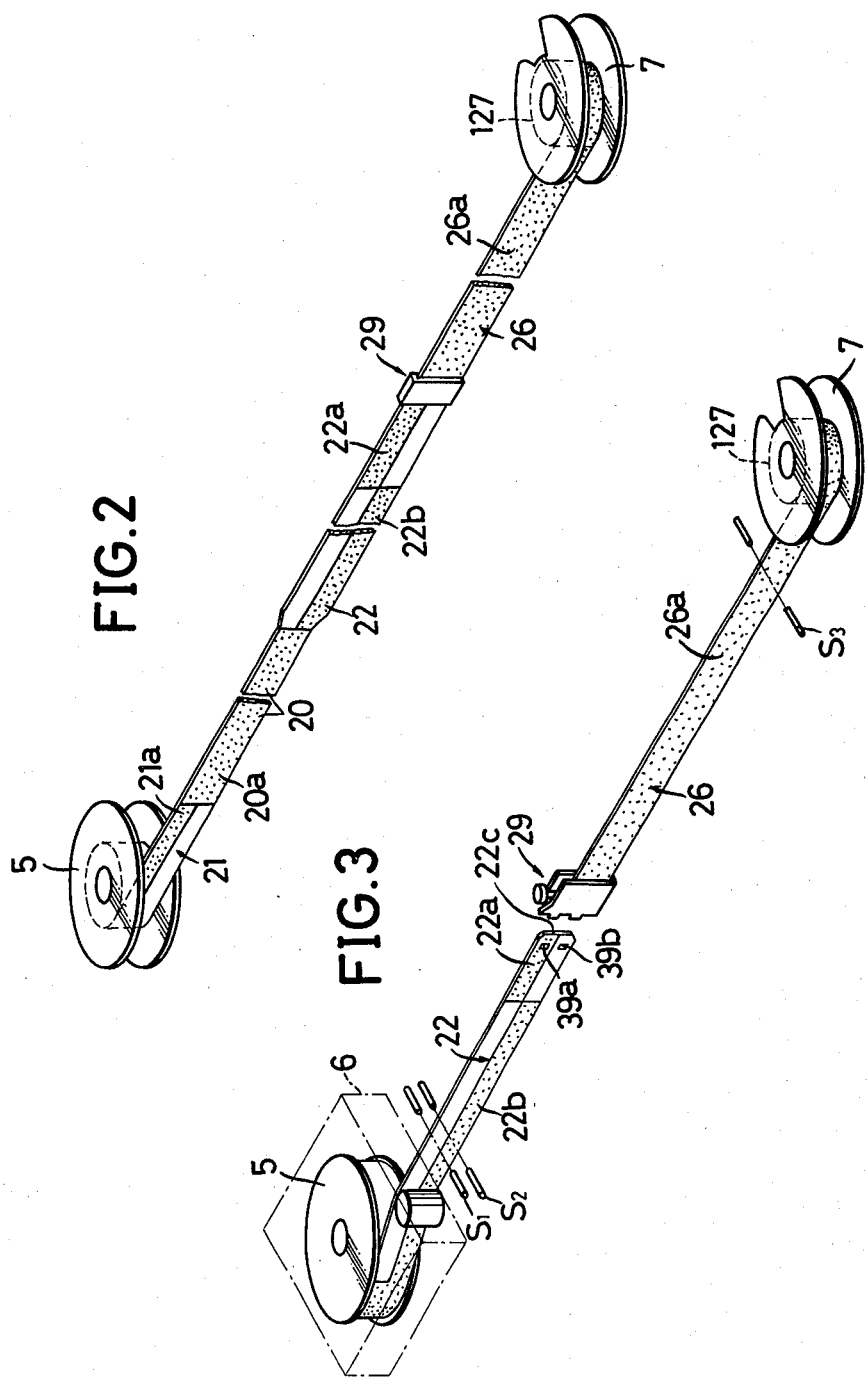

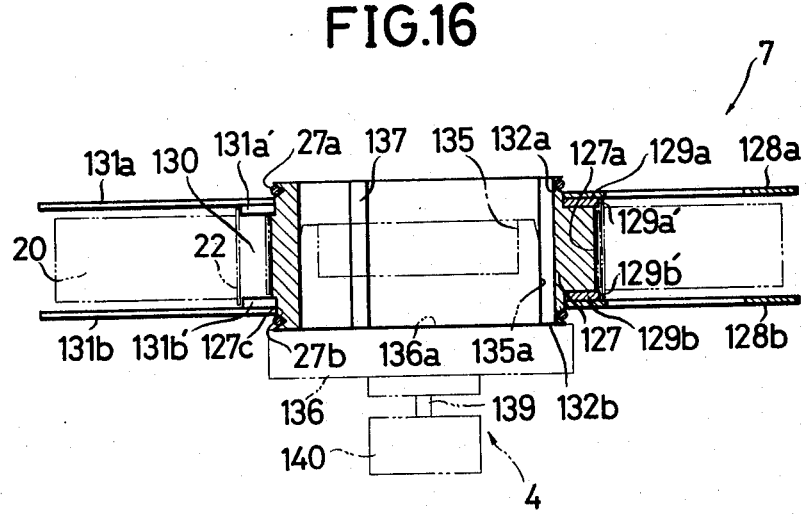
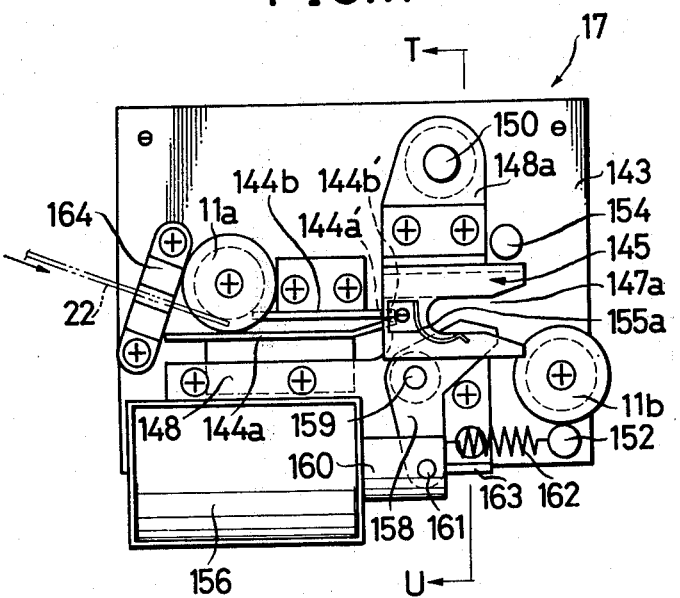

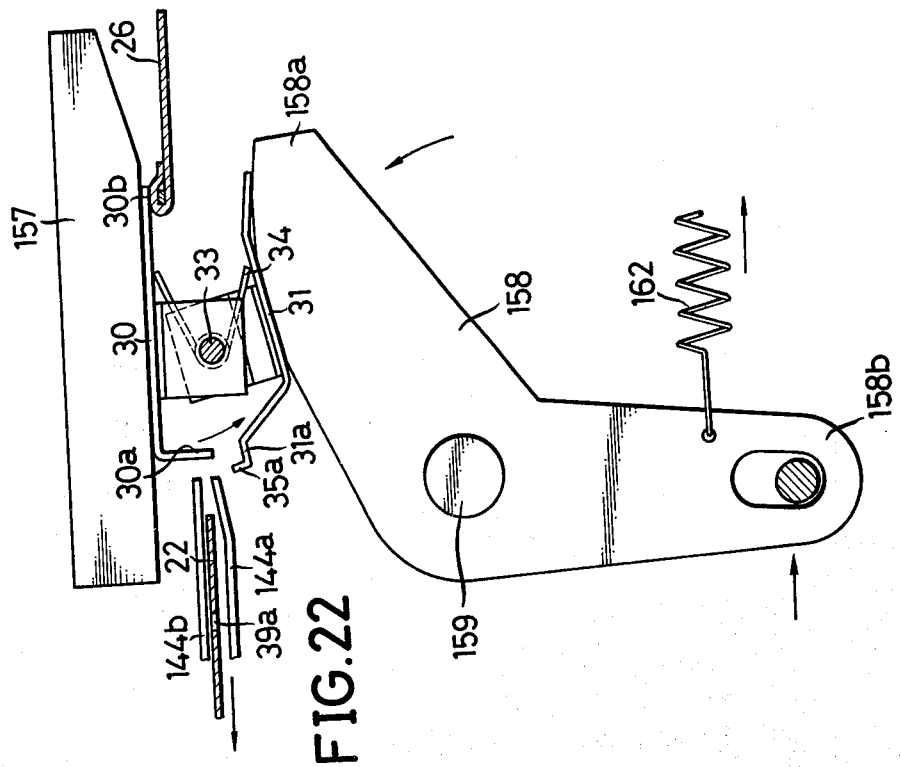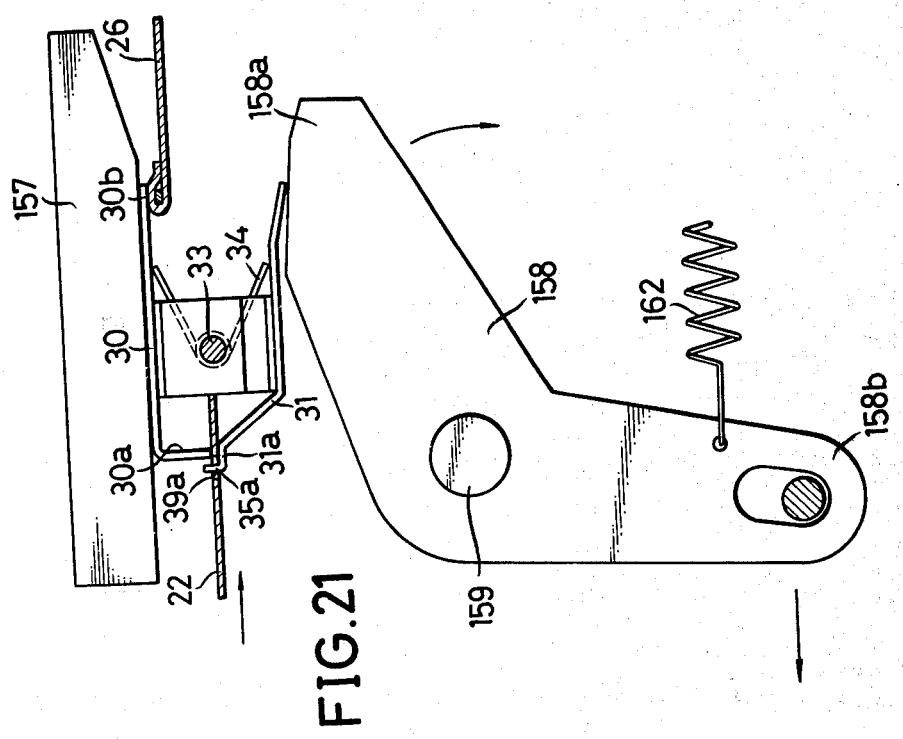

REEL ASSEMBLY

BACKGROUND OF THE INVENTION

1. Field of the Invention

This invention relates generally to an automatic loading apparatus for a VTR or a tape recorder in which a drawing member, for example, a drawing tape wound to a take-up reel is connected to a tape-like member, for example, a leader tape connecting a magnetic tape wound to a supply reel through a connecting means attached to a free end of the drawing tape, on the loading operation and in which the leader tape connecting the magnetic tape is transported on a predetermined path, following the drawing tape to be a accumulated by the take-up reel, and this invention is particularly directed to an improved reel assembly most suitable for the automatic loading apparatus.

2. Description of the Prior Art

In the conventional typical automatic loading apparatus for a VTR, a leader tape with a suitable length, thickness and hardness is connected to a top of a magnetic tape wound to a supply reel. By a roller for drawing out the leader tape in a supply reel, the leader tape is threaded past tape guided and wound on the about 180° portion of a tape guide drum. Then it is accumulated by a take-up reel. In the apparatus, the loading operation relies mainly on the threading function of the tape guides. Therefore, the leader tape is apt to be misthreaded and thereby to be mis-loaded. Numerous tape guides are required for the smooth and sure threading of the leader tape and so the apparatus is complicated in construction.

Moreover, it is difficult for the leader tape to be loaded on such a complicated tape path as includes the circumference of the tape guide drum, for example, the 360° portion of the tape guide drum. And it is possible for the leader tape to be loaded only on such a simple tape path that the leader tape is wound on the 180° portion of the tape guide drum.

Generally, the larger a tape-winding angle of the tape guide drum, the more stabilized the tape running and the higher the fidelity of the recording or the reproducing.

In the conventional apparatus, the leader tape is caught by a catching spring arranged at the take-up reel, after passing through the tape path, to be wound automatically to the take-up reel. However, the automatically winding of the leader tape is very troublesome and misoperation is apt to occur.

On the other hand, the automatic loading apparatus as described at the opening paragraph, the required loading is performed in such a manner that the tape-like member is drawn by the tape drawing member. Accordingly, the apparatus has the advantage that the automatic loading can be always surely and smoothly performed.

However, when the tape is wound around the take-up reel, a swelling is formed at a part of the circumference of the take-up reel by the connecting means connected to the top end of the drawing member. Consequently, the tape cannot be orderly wound in circle around the take-up reel. The tape is wrinkled with the swelling. For that reason, the life of the tape is shortened and the tape tension varies with the tape running to cause the wow-flutter.

In the automatic loading apparatus, wherein the tape-like member is drawn by the drawing member, the loading operation can be surely and smoothly performed, but the apparatus has the above-described disadvantage.

SUMMARY OF THE INVENTION

Accordingly, it is an object of this invention to provide a reel assembly in which a leader tape and a magnetic tape can be orderly wound in circle around a reel hub provided with a cut-out portion without a swelling.

Another object of this invention is to provide a reel assembly in which the leader tape and a drawing member connecting the leader tape can be smoothly led to the reel hub.

A further object of this invention is to provide a reel assembly in which the leader tape is drawn by a drawing tape as a drawing member, and the leader tape and the drawing tape can be smoothly wound around the reel hub without wrinkling. A still further object of this invention is to provide a reel assembly in which the leader tape is drawn by a pair of drawing wires as a drawing member and the leader tape and the drawing wires can be smoothly wound around the reel hub without wrinkling.

A still further object of this invention is to provide a reel assembly which is simple in construction and manufacture.

In accordance with a aspect of this invention, a reel assembly comprises a flexible take drawing member with a required length, a connecting means for connecting the flexible tape drawing member to another tape-like member, a reel hub, and at least one cut-out portion formed on the circumference of the reel hub. The connecting means is attached to a top end of the flexible tape drawing member and it is led into the cutout portion when the tape drawing member and the tape-like member are wound around the reel hub, whereby the take-like member can be orderly wound in circle around the reel hub.

The above, and other objects features and advantages of the invention, will be apparent in the following detailed description of illustrative embodiments thereof which is to be read in connection with the accompanying drawings.

BRIEF DESCRIPTION OF THE DRAWINGS

FIG. 2 is a perspective view of a leader tape and a drawing member in a reel assembly according to one embodiment of this invention;

FIG. 3 is a perspective view illustrating the connection of a drawing member with a leader tape in a reel assembly according to one embodiment of this invention;

FIG. 16 is a cross sectional view taken along the lines R-S on FIG 15;

FIG. 17 is a plan view of a connecting means in a reel assembly according to one embodiment of this invention;

FIG. 21 is a plan view illustrating the connection of a leader tape to a drawing tape by the connecting means;

Figure 1:
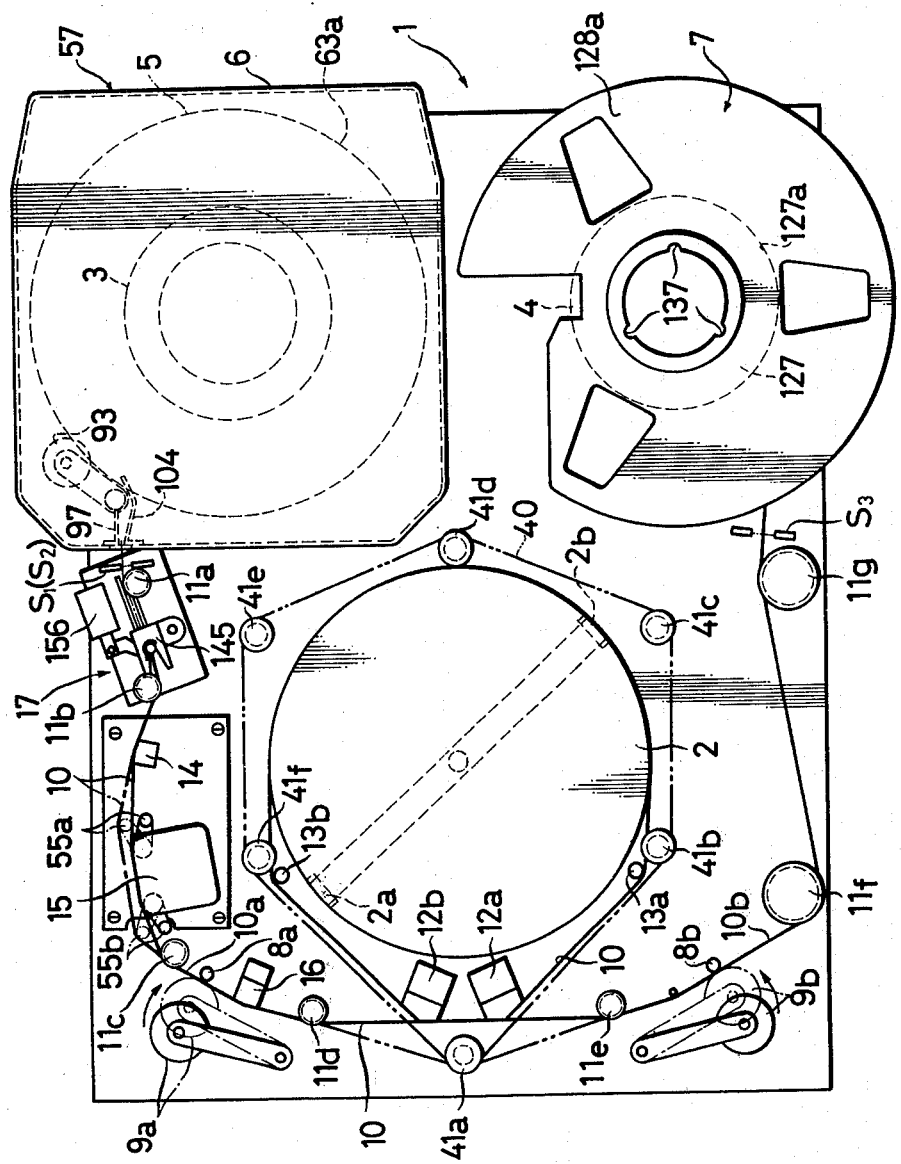
FIG. 1 is a plan view of an automatic loading apparatus provided with a reel assembly according to one embodiment of this invention.

22 is a plan view illustrating the disconnection of the leader tape from the drawing tape and;

FIG. 23A to FIG. 23I are views showing a sequence control by sensing means.

DESCRIPTION OF THE PREFERRED EMBODIMENTS

FIG. 1 shows a plan view of an automatic loading apparatus for a video tape recorder (VTR).

A tape guide drum 2 (hereafter called drum) is mounted on a chassis 1 of a VTR. A pair of rotary heads 2a, 2b are contained within the drum 2. A supply reel holder 3 and a take-up reel holder 4 are arranged on the chassis 1 in parallel with each other at the right hand of the drum 2. A cassette 6 containing a supply real 5 is mounted demountably on the supply reel holder 3 and a take-up reel 7 of the open reel type is mounted demountably on the take-up reel holder 4. The cassette 6 is set at the given position of the supply reel holder 3 by a not shown cassette holder.

A pair of capstans 8a, 8b are arranged at the left hand of the drum 2 on the chassis 1 of the VTR in parallel with each other. So the VTR is of the dual capstan type. Pinch rollers 9a, 9b are arranged by the sides of both capstans 8a, 8b, respectively.

A tape path 10 is defined by seven tape guide members 11a-11g, a pair of guide members 12a, 12b, for regulating the tape running direction and a pair of tape guide pins 13a, 13b. The guide members 11a, 11b, 11c, 11d, 12a and 13a define a supply-side tape path 10a for transporting a magnetic tape from the supply reel 5 to the drum 2. And the guide members 13b, 12b, 11e, 11f and 11g define a take-up-side tape path 10b for transporting the magnetic tape from the drum 2 to the take-up reel 7. The guide members 11a, 11b, 11c, 11d, 12a and 13a on the supply-side tape path 10a are positioned at a higher level than the guide members 13b, 12b, 11e, 11f, and 11g on the take-up-side tape path 10b. The magnetic tape is supplied from the supply reel 5 to the drum 2 through the higher tape path 10a and it is transported from the drum 2 to the tape-up reel 7 through the lower tape path 10b.

The capstans 8a and 8b are arranged between the tape guide members 11c and 11d, and between the tape guide members 11e and 11f, respectively. The one capstan 8a drives the magnetic tape on the supply-side tape path 10a and the other capstan 8b drives the magnetic tape on the take-up-side tape path 10b.

An audio erasing head 14 and an audio and/or control head 15 are arranged between the tape guide member 11b and 11c. An a video erasing head 16 is arranged between the tape guide members 11c and 11d.

The magnetic tape from the supply reel 5 is transported around the drum 2 through the tape guide members 11a, 11b, the audio erasing head 14, the audio and/or control head 15, the tape guide members 11c, the capstan 8a, the video erasing head 16, the tape guide member 11d, the guide member 12a for regulating the tape running direction and the tape guide pin 13a. And then it is trnsported to the take-up reel 7, through the tape guide pin 13b, the guide member 12b for regulating the tape running direction, the tape guide member 11e, the capstan 8b, the tape guide members 11f and 11g, to be accumulated by the take-up reel 7.

The guide member 12a and the tape guide pin 13a are tapered so as to incline the horizontally transported magnetic tape and to wind the magnetic tape obliquely around the drum 2. Moreover, the tape guide pin 13b and the guide member 12b are tapered so as to regulate the magnetic tape transported from the drum 2 and to transport it to the take-up reel 17 in the horizontal direction. The pair of the tape guide pins 13a, 13b regulate the angle by which the magnetic tape is wound on the drum 2. The angle is about 180°.

A tape connecting device 17 is arranged between the tape guide members 11a and 11b nearest the supply reel 5. By the tape connecting device 17, a leader tape and a guide tape or a drawing tape are connected to each other or are disconnected from each other, through a connecting means as below mentioned.

Next, a tape-like member threaded in the take path 10 will be described in detail with reference to FIG. 2-FIG. 6.

As shown on FIG. 2, a main portion of the tape-like member is a magnetic tape 20. The magnetic tape 20 is wound around a reel hub (below mentioned) of the supply reel 5 through a trailer tape 21 connected to one end of the magnetic tape 20. A leader tape 22 with a suitable thickness, hardness and length is connected to another end of the magnetic tape 20. The width of the trailer tape 21 is the same as that of the magnetic tape 20, while the width of the leader tape 22 is slightly larger than that of the magnetic tape 20. As well known, the magnetic tape 20 is opaque since its base is coated with a magnetic film 20a. A base of the trailer tape 21 is transparent. The upper half of the base is coated with an opaque film 21a such as a metallic film. Also a base of the leader tape 22 is transparent. The upper half of the end portion of the base is coated with an opaque film 22a as above mentioned, and the lower half of the remaining portion of the base is coated with an opaque film 22b as above mentioned.

When the tape-like member is transported on the tape path 10, the magnetic film 20a, the opaque films 21a, 22a and 22b are detected by sensing means in sequence. The sensing means comprises a light source such as a lamp and a photosensitive element such as a phototransistor. Two sensing means $S_1$ and $S_2$ are arranged by the side of the tape guide member 11a nearest the supply reel 5, to detect the upper half and the lower half of the tape-like member, respectively. A further sensing means $S_3$ is arranged by the side of the tape guide member 11g nearest the take-up reel 7, to detect the upper half of the tape-like member.

When the magnetic film 20a, the opaque films 21a, 22a, 22b and 26a intercept the light from the light source, the sensing means $S_1$, $S_2$ and $S_3$ generate an output O, respectively. And when the transparent portion of the tape 21 or 22 passes by the sensing means $S_1$, $S_2$ and $S_3$, or when no tape-like member passes by sensing means $S_1$, $S_2$ and $S_3$, the sensing means $S_1$, $S_2$ and $S_3$ generates an output 1, respectively.

In this embodiment, a tape-drawing member is drawn out from the take-up reel 7 by the given length in advance. One end of the tape-drawing member is fixed to the take-up reel 7. And when the leader tape 22 is drawn out from the supply reel 5 by the given length, the top end 22c of the leader tape 22 is automatically connected to the top end of the tape-drawing member and then the tape-drawing member is accumulated by the take-up reel 7.

Figure 4:
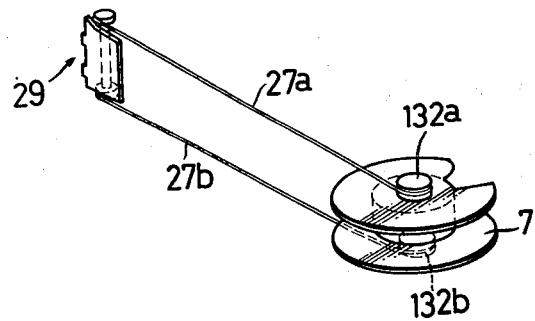
FIG. 4 is a perspective view illustrating a pair of drawing wires in a reel assembly according to one embodiment of this invention.

As the tape-drawing member, a drawing tape 26 shown on FIG. 3 or a pair of drawing wires 27a, 27b shown on FIG. 4 is used in this embodiment. The width of the drawing tape 26 is nearly the same as the width of the magnetic tape 20. On end of the drawing tape 26 is fixed to a below-mentioned reel hub 127 by which the drawing tape 26 is accumulated. The whole drawing tape 26 is coated with an opaque film 26a such as a metallic film. The distance between the drawing wires 27a and 27b is larger than the width of the leader tape 22. The drawing wires 27b and 27b are fixed to a pair of pulleys 132a, 132b formed at both ends of the below-mentioned reel hub 127 of the take-up reel 7 by which the drawing wires 27a and 27b are accumulated.

Figure 5:
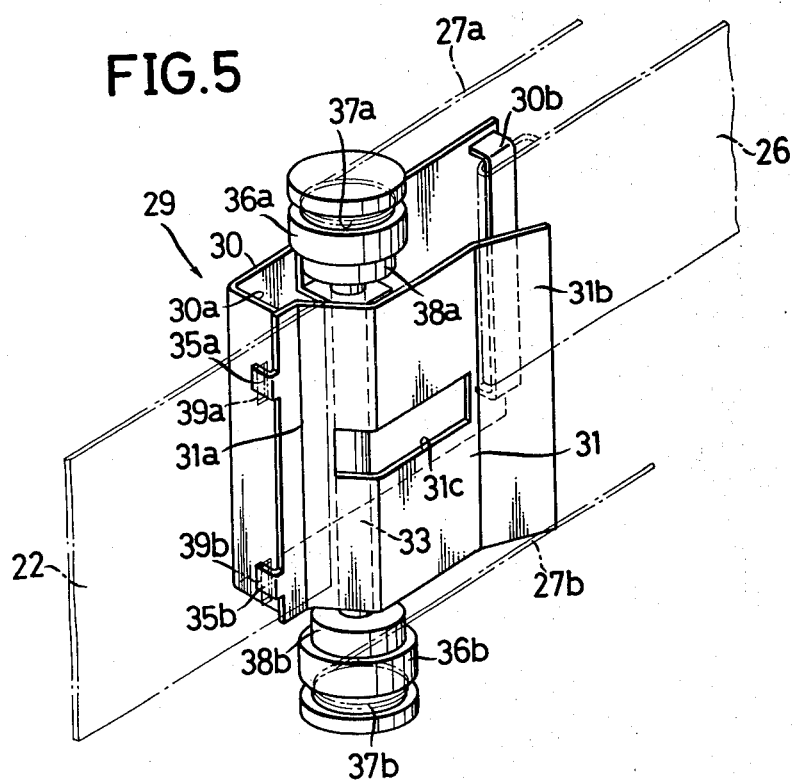
FIG. 5 is a perspective view of a clip-like member in a reel assembly according to one embodiment of this invention.
Figure 6:
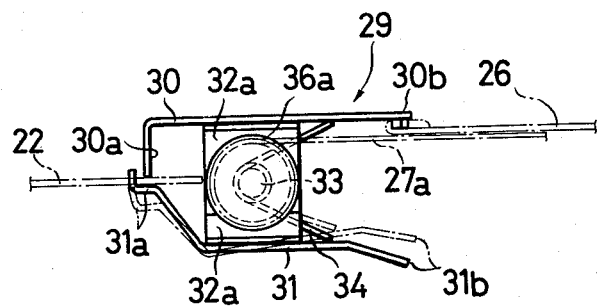
FIG. 6 is a plan view of the clip-like member shown on FIG. 5.

A connecting means is attached to the top of the drawing tape 26 or to the top end of the drawing wires 27a and 27b. As the connecting means, a clip-like member 29 shown on FIG. 5 and FIG. 6 is used in this embodiment.

The clip-like member 29 comprises a clip base 30 and a clip lever 31. The clip base 30 and the clip lever 31 are pivoted to a supporting axis 33 passing through leader tape stoppers 32a, 32b fixed to each of the clip base 30 and the clip lever 31. Leader tape catching members 30a and 31a are formed at top ends of the clip base 30 and the clip lever 31, respectively, and they are urged to each other by a spring 34. A pair of engaging projectings 35a, 35b are formed at the edge of the one leader tape catching member 31a. An opening 31c for fitting a below-mentioned support lever 158 is formed at the center of the clip lever 31. The top of the drawing tape 26 is fixed to a tape-fixing member 30b formed at the rear end of the clip base 30. A pair of rollers 36a, 36b are arranged at both ends of the supporting axis 33. When the drawing wires 27a, 27b are used as the tape-drawing member, the top ends of the drawing wires 27a, 27b are fixed to wire fixing grooves 37a, 37b formed on the rollers 36a, 36b, respectively. And roller portions 38a, 38b with a smaller diameter are formed on the opposite ends of the rollers 36a, 36b, respectively.

A pair of engaging openings 39a, 39b are formed on the top end 22c of the leader tape 22 (FIG. 3). The leader tape 22 and the drawing tape 26 are connected to each other in such a manner that the top end 22c of the leader tape 22 is nipped between the leader tape catching member 30a and 31a of the clip-like member 29 by the urging force of the spring 34 and the engaging projections 35a, 35b of the clip-like member 29 are engaged with the engaging openings 39a and 39b. And the leader tape 22 and the drawing tape 26 are disconnected from each other in such a manner that the leader tape catching members 30a, 31a are separated from each other against the spring 34 and the engaging projections 35a, 35b are deengaged from the engaging openings 39a, 39b.

When the drawing tape 26 is used as the tape-drawing member, the drawing tape 26 is transported on the tape path 10 as shown by the solid line on FIG. 1. And when the drawing wires 27a, 27b are used as the tape-drawing member, the drawing wires 27a, 27b are transported on another path 40 as shown by the two dots-dash line on FIG. 1, around the drum 2. Six wire guide members 41a-41f are arranged around the drum 2 to guide the drawing wires 27a, 27b.

Figure 7:
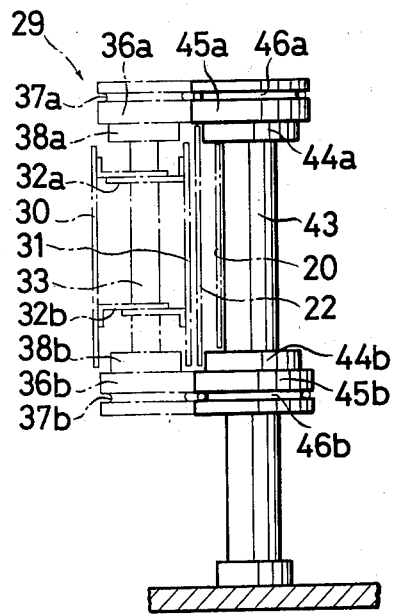
FIG. 7 is an elevational view of a tape guide member in the automatic loading apparatus.

Although the tape guide members 11c-11g are different in diameter as shown on FIG. 1, all of them are nearly H-shapedly formed as shown on FIG. 7. The tape guide members 11a, 11b are constructed as rollers provided with a pair of flanges. A pair of smaller roller portions 44a, 44b and a pair of larger roller portions 45a, 45b are formed at both ends of a central axis 43 of the tape guide members 11c-11g as shown on FIG. 7. And guide grooves 46a, 46b for the drawing wires 27a, 27b are formed on the larger roller portions 45a, 45b. As shown by the dot-dash lines on FIG. 7, the rollers 36a, 36b of the clip-like member 29 are guided on the larger roller portions 45a, 45b, the leader tape 22 is guide on the smaller roller portions 44a, 44b and the magnetic tape 20 is guided on the central axis 43. When the drawing wires 27a, 27b are used, they are guided on the guide grooves 46a, 46b of the larger roller portions 45a, 45b. Consequently, the tape guides members 11a-11g and below-mentioned movable pins 55a, 55b work to prevent the clip-like member 29 from contacting directly with the heads 14, 15, 16 and damaging them.

Figure 8:
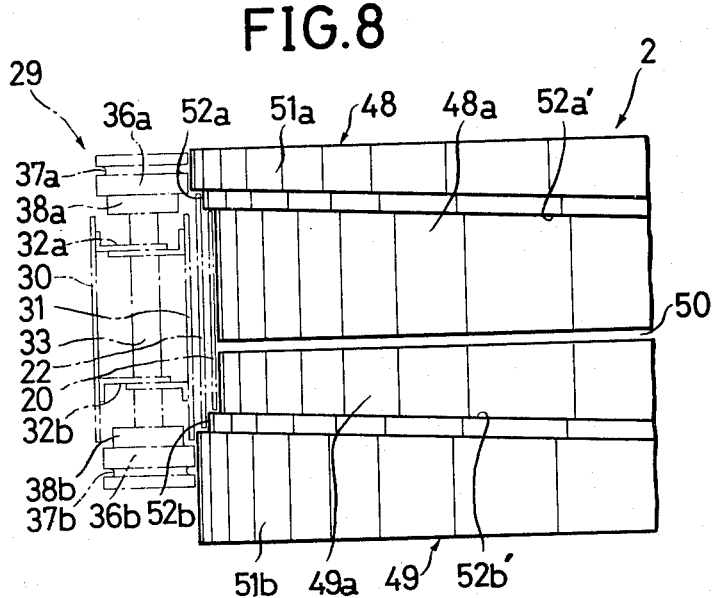
FIG. 8 is an elevational view of a tape guide drum in the automatic loading apparatus.

As shown on FIG. 8, the drum 2 comprises an upper drum 48 and a lower drum 49. The rotary heads 2a, 2b are rotated in a gap 50 between the upper drum 48 and the lower drum 49. A pair of guide flanges 51a, 51b is formed on both ends of the drum 2. Adjacent to the guide flanges 51a, 51b, a pair of leader tape guides 52a, 52b is stepwise formed on circumferences 48a, 49a of the upper drum 48 and the lower drum 49. The leader tape guides 52a and 52b define a pair of tape guide surfaces 52a', 52b' inclined in parallel with each other by which the magnetic tape 20 is guided with its both edges.

On the loading by the drawing tape 26, the rollers 36a, 36b of the clip-like member 29 are guided on the guide flanges 51a, 51b and the leader tape 22 is guided on the leader tape guides 52a, 52b, as shown on FIG. 8. At that time, the clip-like member 29 and the leader tape 22 do not contact with the circumferences 48a, 49a of the drum 2. And only the magnetic tape 20 contacts with the circumferences 48a, 49a, covering the gap 50. Consequently, the flip-like member 29 and the leader tape 22 are prevented from contacting with the circumferences 48a, 49a and thereby damaging them. The circumferences 48a, 49a are highly accurately machined so as to minimize the friction with the magnetic tape 20. The contact of the clip-like member 29 and the leader tape 22 with the circumferences 48a, 49a is harmful to the stable running of the magnetic tape 20. The magnetic tape 20 is regulated by the guide surfaces 52a', 52b' of the leader tape guides 52a, 52b, to be obliquely transported on the circumference of the drum 2.

Figure 9:
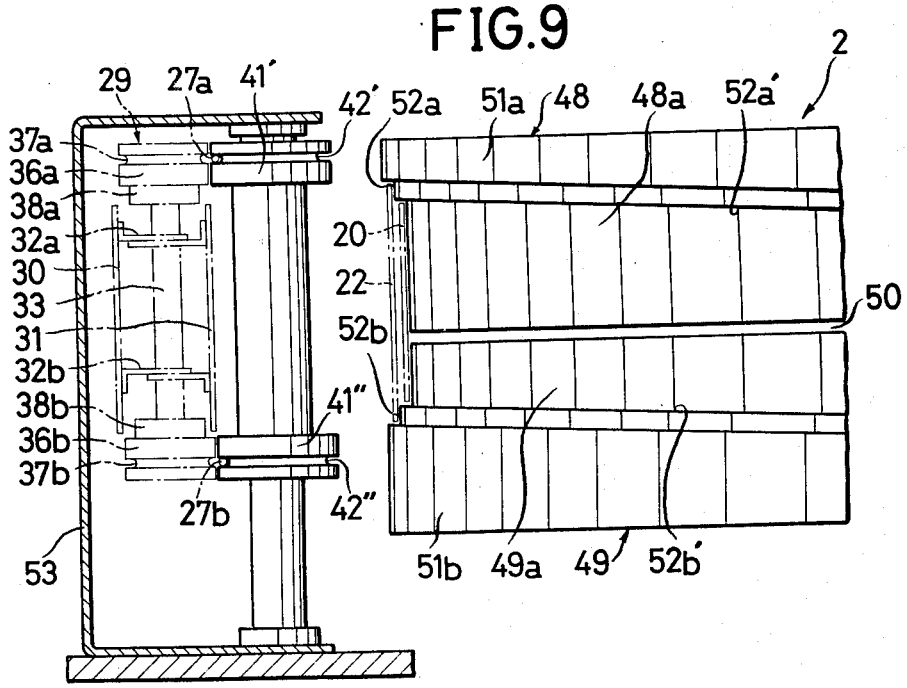
FIG. 9 is an elevational view illustrating the relationship between the tape guide drum and a wire guide member.

As shown on FIG. 9, a pair of rollers 41', 41'' is arranged at both ends of the wire guide members 41a-41f. Guide grooves 42', 42'' are formed on the rollers 41', 41'', respectively. The wire guide members 41a-41f are supported on the chassis 1 of the VTR, by a U-shaped holder 53. On the loading, as shown by the dot-dash line on FIG. 9, the rollers 36a, 36b of the clip-like member 29 are guided on the rollers 41', 41'', and the drawing wires 27a, 27b are guided on the guide grooves 42', 42''. Among the wire guide members 41a-41f, only the wire guide member 41a positioned at the entrance to the drum 2 comprises two of the above-described structures with the pair of rollers 41', 41'' which are vertically arranged. The upper of the wire guide member 41a functions to lead the tape transported on the supply-side tape path 10a, toward the drum 2 and the lower of the wire guide member 41a functions to lead the tape transported around the drum 2, toward the take-up-side path 10b.

As shown by the solid lines on FIG. 1, the pinch rollers 9a, 9b are separated from the capstans 8a, 8b, on the loading, the unloading, the tape fast forwarding or the tape rewinding, while they are pressed to the capstans 8a, 8b on the recording of the reproducing, as shown by the dot-dash line on FIG. 1.

A pair of movable pins 55*l*, 55b are arranged at the sides of the audio and/or control head 15. The movable pins 55a, 55b are moved to the position shown by the dot-dash line on FIG. 1, on the loading, the unloading, the tape fast forwarding or the tape rewinding, whereby the clip-like member 29 and the leader tape 22 are prevented from contacting with the heads 14, 15, 16. And the movable pins 55a, 55b are moved to the position shown by the solid lines on FIG. 1, on the recording or the reproducing, whereby the magnetic tape 20 contacts surely with the heads 14, 15, 16.

The cassette 6 and the supply reel 5 will be described in detail with reference to FIG. 10--FIG. 14.

Figure 10:
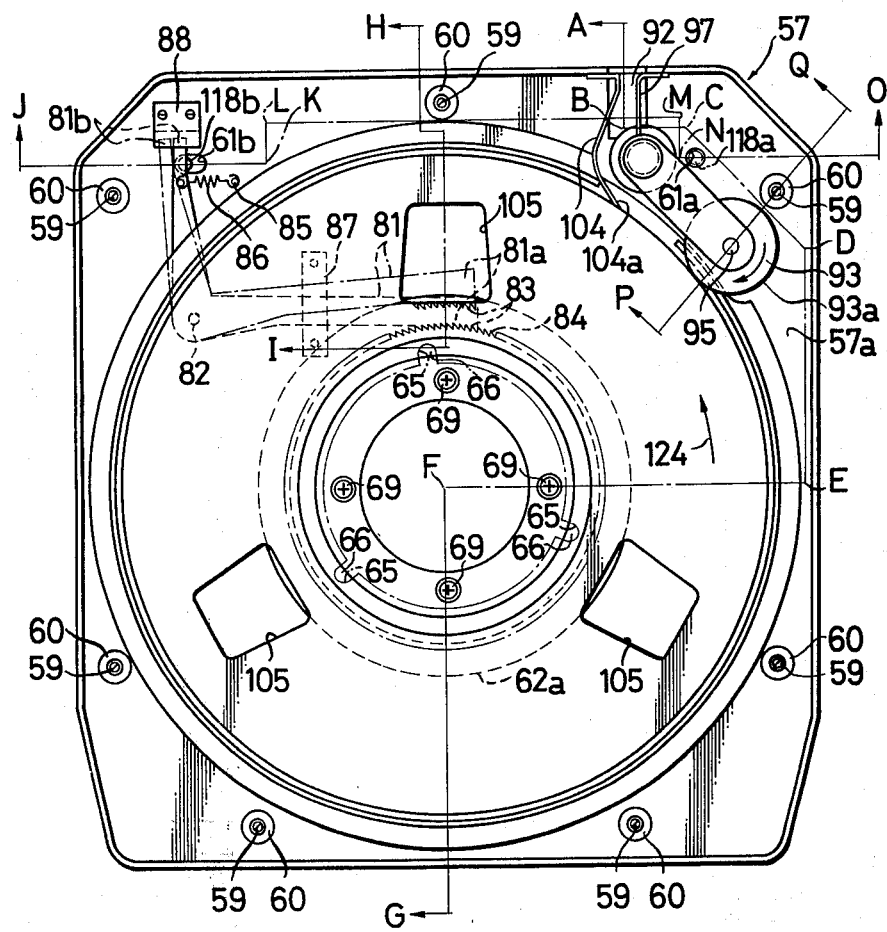
FIG. 10 is a plan view of a cassette except its cover.
Figure 11:
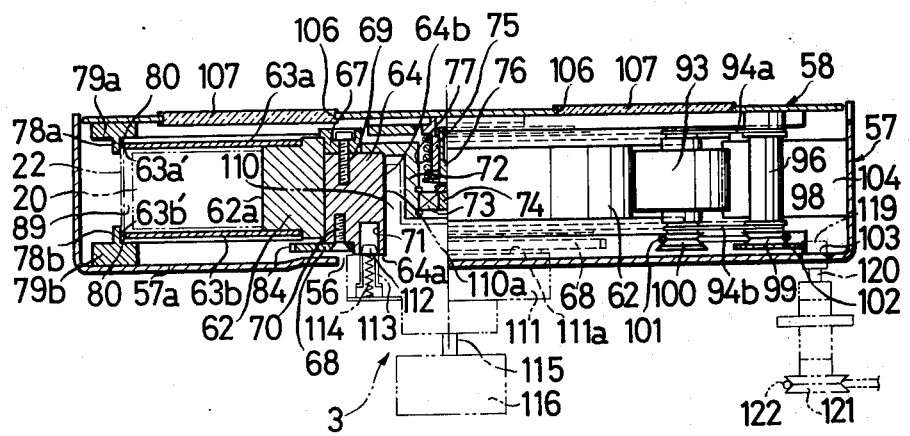
FIG. 11 is a cross sectional view taken along the lines A-G on FIG. 10.

As shown on FIG. 10 and FIG. 11, the cassette 6 comprises a case 57 and a cover 58. The cover 58 is fixed to the case 57 by seven screws 59 and cylindrical bosses 60 arranged around the supply reel 5, as shown on FIG. 14, so as to close the case 57. An inserting opening 56 for the supply reel holder 3 is formed on the center of a bottom 57a of the case 57. A round opening 61a and an oval opening 61b are formed on the bottom 57a near the corners of the case 57, as clearly shown on FIG. 10.

The supply reel 5 comprises a real hub 62, a pair of reel flanges 63a, 63b and a reel boss 64. The reel flanges 63a 63b are attached to the reel hub 62 as one body. The reel boss 64 is inserted into the reel hub 62. Three vertical grooves 65 and associated projections 66 are formed on the inner circumference of the reel hub 62 and the outer circumference of the reel boss 64, wherby they are regulated not so as to be rotatable to each other. A set ring 67 and a ratchet disc 68 are fixed to the upper face and the lower face of the reel boss by four screws 69, 70, respectively. Three opening 71 for reel-driving pins are formed on the lower face 64a of the reel boss 64 at regular angular intervals. A cylinder 72 for holding bearings is fixed concentrically to the reel boss 64, for example, with adhesive. A thrust bearings 73 and a thrust block 74 are attached to the lower end of the inner circumference of the cylinder 72. A thrust pin 76 is supported movably in the vertical direction by a supporting cylinder 75 attached to the center of the lower surface of the cover 58. A spring 77 is disposed between the cover 58 and the thrust pin 76 to urge the thrust pin 76 downward into contact with the thrust block 74. Consequently, the urging force of the spring 77 is transmitted to the supply reel 5 through the thrust pin 76, the thrust block 74, the thrust bearing 73 and the cylinder 72, and so the supply reel 5 is normally urged downward in the cassette 6.

Figure 12:
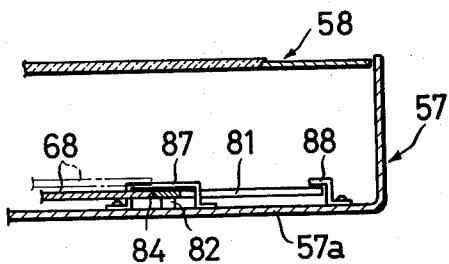
FIG. 12 is a cross sectional view taken along the lines H-I on FIG. 10, partly broken away.

As shown clearly on FIG. 11, a pair of leader tape guide rings 78a, 78b and supporting members 79a, 79b are fixed to the lower surface of the cover 58 and the bottom 57a of the case 57, respectively, around the supply reel 5 in the cassette 6. Circular gaps 80 for the leader tape 22 are formed between the reel flanges 63a, 63b and the leader tape guide rings 78a, 78b. INearly L-shaped lever 81 for preventing reverse-rotation is supported at a supporting pin 82 rotatably in a horizontal plane above the bottom 57a of the case 57 of the cassette 6 (FIG. 10). The level 81 is arranged so as to be positioned at the same level as the ratchet disc 68 when the supply reel 5 is positioned at the lower level in the cassette 6. The rack 83 is formed on one side of a one end 81a of the lever 81. The rack 83 is engaged separably with a ratchet 84 of the ratchet disc 68. By a spring 86 extended between a free end 81b of the lever 81 and a pin 85 fixed to the bottom 57a, the lever 81 is urged clock-wise around the pin 82 in FIG. 10 so that the rack 83 of the lever 81 is engaged with the ratchet 84 of the ratchet disc 68. The rotation of the lever 81 is regulated by a stopper 87 fixed to the bottom 57a (FIG. 12). The free end 81b of the lever 81 is positioned above the oval opening 61b. A stopper member 88 fixed to the bottom 57a prevents the free end 81b from being unexpectedly lifted.

Figure 13:
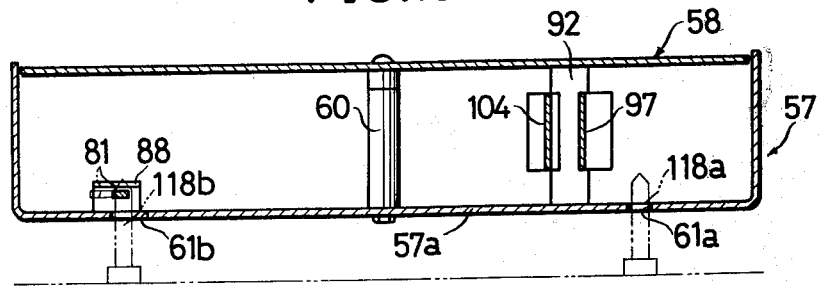
FIG. 13 is a cross sectional view taken along the lines J-O on FIG. 10, partly omitted.

The distance between the upper reel flange 63a and the lower reel flange 63b is slightly larger than the width of the magnetic tape 20, and it is slightly smaller than the width of the leader tape 22. The magnetic tape 20 is fixed to a part of the circumference of the reel hub 62 of the supply reel 5, through the trailer tape 21, and it is wound around the reel hub 62 between the upper flange 63a and the lower flange 63b. The leader tape 22 connected to the magnetic tape 20 is wound on the circumferences of the reel flanges 63a, 63b in the circular gaps 80. A clearance 89 of 5 to 10 mm is formed between the wound leader tape 22 and the most outside of the wound magnetic tape 20. An opening 92 for tape entrance is formed on a side wall of the case 57 of the cassette 6 (FIG. 10 and FIG. 13). A roller 93 for drawing out the leader tape 22 is arranged near the opening 92 for tape entrance in the cassette 6. The roller 93 is formed of rubber, and it is supported rotatably by a shaft 95 at one end of a pair or roller supporting levers 94a, 94b. Another end of the pair of the roller supporting levers 94a, 94b is fixed to the case 58 and the cover 57 of the cassette 6 through a cylindical axis 9 and a leader tape guide plate 97. A rotary shaft 98 is inserted into the cylindrical axis 96. The rotary shaft 98 and the shaft 95 are interconnected with each other through pulley 99, 100 and a belt 101 wound around the pulleys 99, 100. A gear 102 is fixed to the lower end of the rotary shaft 98. The gear 102 is positioned adjacent to an opening 103 formed on the bottom 57a near the opening 92 for tape entrance.

Figure 14:
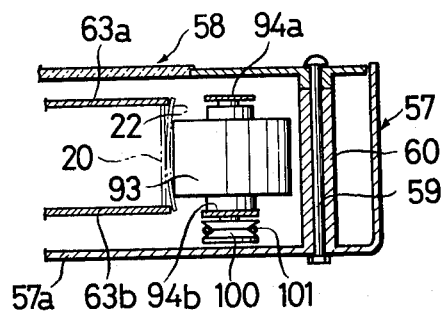
FIG. 14 is a cross sectional view taken along the lines P-Q on FIG. 10, partly broken away.

As shown on FIG. 14, the height of the roller 93 is considerably smaller than the distance between the flanges 63a and 63b of the supply reel 5. The roller 93 is slightly projected into the clearance 89 between the flanges 63a and 63b. Consequently, the leader tape 22 wound on the circumferences 63a', 63b' of the reel flanges 63a, 63b is elastically pressed by the roller 93. Accordingly, the upper end and the lower end of the wound leader tape 22 are pressed to the circumferences 63a', 63b' of the reel flanges 63a, 63b.

A leader tape guide member 104 is arranged at the opening 92, opposite to the leader tape guide plate 97 in the cassette 6. A top end 104a of the leader tape guide member 104 is projected into the clearance 89 between the reel flanges 63a, 63b of the supply reel 5. The top end 104a is opposed to the rotation of the supply reel 5 for drawing out the leader tape 22 and the guide member 104 is inclined in a suitable angle with the direction tangential to the circumferences 63a', 63b' of the reel flanges 63a, 63b.

Three openings 105 are formed on the reel flanges 63a, 63b (FIG. 10). And two openings 106 are formed on the cover 58 (FIG. 11). The openings 106 are closed by transparent plates 107.

Next, the supply reel holder 3 will be described in detail with reference to FIG. 11.

As shown by the two dots-dash line on FIG. 11, a cylindrical member 110 is formed on the center of the supply reel holder 3. A base 111 is fixed on the lower end of the cylindrical member 110, for mounting the supply reel 5.

When the supply reel 5 is mounted on the supply reel holder 3, the cylindrical member 110 is inserted into the reel boss 64. A circumference 110a of the cylindrical member 110 contacts closely with an inner circumference 64b of the reel boss 64. A central axis of the supply reel 5 is coincident with that of the supply reel holder 3. Three driving pins 112 are fixed to the base 111 at regular angular intervals. The driving pins 112 are supported movably in three holes 113, respectively, and they are urged upward by springs 114 inserted into the holes 113.

A pair of positioning pins 118a, 118b are fixed to the chassis 1 of the VTR, as shown by the two dot-dash line on FIG. 13. The positioning pins 118a, 118b define conical ends and can be inserted into the openings 61b, 61b of the cassette 6. Moreover, a rotary shaft 120 with a gear 119 is arranged on the chassis 1 of the VTR, as shown by the two dots-dash line on FIG. 11. The gear 119 can be inserted into the opening 103 of the cassette 6, for driving the rollers 93, and it is inter-connected to a not shown motor through the rotary shaft 120, a pulley 121 and a belt 122.

Next, the mounting of the cassette 6 and the supply reel 5 to the suppy reel holder 3 and the operation of the leader tape 22 will be described.

Before the cassette 6 is mounted at the given position of the chassis 1 of the VTR, the supply reel 5 is positioned at the lower lever in the cassette 6 since the supply reel 5 is urged downward by the spring 77. The margin of the lower reel flange 63b is elastically pressed to the lower guide ring base 79b. Both of the leader tape guide rings 78a, 78b regulate the movement of the supply rel 5 in the horizontal direction or in the direction at right angles with the central axis of the supply reel 5. In that condition, the level 81 is positioned at the same level as the ratchet disc 68 in the horizontal plane and the rack 83 of the level 81 urged by the spring 86 is engaged with the ratched 84 of the ratchet disc 68.

When the rack 83 is engaged with the ratchet 84, the supply reel 5 cannot be rotated anticlockwise or in the direction of the arrow 124 shown in FIG. 10 in which the leader tape 22 can be drawn out. In that condition, the supply reel 5 can be rotated only clockwise.

In other words, when the cassette 6 is not mounted at the given position, the supply reel 5 is positioned at the lower level in the cassette 6 and the rotation for drawing out the leader tape 22 is not allowed in the direction of the arrow 124. Therefore, for example, on the transport of the cassette 6, it is prevented that the supply reel 5 is unexpectedly rotated in the direction of the arrow 124 to draw out the leader tape 22, by any shock or vibration.

When the supply reel holder 3 is inserted into the opening 56 to mount the cassette 6 at the given position, the cylindrical member 110 is inserted into the reel boss 64 and so the central axis of the supply reel 3 is coincident with that of the supply reel holder 3. The lower face 64a of the reel boss 64 of the supply reel 5 contacts with the upper face 111a of the base 111 of the supply reel holder 3 (FIG. 11). The pair of the positioning pins 118a, 118b is inserted into the pair of the openings 61a, 61b of the cassette 6, whereby the cassette 6 is accurately positioned at the given position (FIG. 13). At that time, the one pin 118b pushes the free end 81b of the lever 81 left hand in FIG. 10 and so the lever 81 is rotated anticlockwise around the supporting pin 82 against the spring 86, as shown by the dot-dash line shown on FIG. 10. Consequently, the rack 83 of the lever 81 and the ratchet 84 of the ratchet disc 68 are separated from each other and the rotation of the supply reel 5 for drawing out the leader tape 22 becomes possible in the direction of the arrow 124.

When the supply reel 5 is mounted on the supply reel holder 3, the supply reel 5 is lifted up through the supply reel holder 3 against the spring 77, so that the lower reel flange 63b is separated upward from the lower guide ring base 79b. Since the supply reel 5 is not regulated by the upper guide ring base 79a and the lower guide ring base 79b, it can be rotated in both directions. Moreover, the gear 119 is inserted into the opening 103 of the cassette 6 to be engaged with the gear 102.

When the gear 119 is rotated by the not shown motor in the above-described condition, the roller 93 is rotated clockwise in FIG. 10 through the gear 102, the rotary shaft 98, the pulley 99, the belt 101, the pulley 100 and the shaft 95. The supply reel 5 is rotated in the direction of the arrow 124 and so the leader tape 22 is automatically drawn out through the opening 92 of the cassette 6.

The rotation of the roller 93 is frictionally transmitted to the reel flanges 63a, 63b of the supply reel 5 through the leader tape 22 to rotate the supply reel 5 in the direction of the arrow 124. Since a motor 116 (FIG. 11) is not yet energized, the supply reel 5 is driven by an extremely small torque, together with the supply reel holder 3. After the top end 22c of the leader tape 22 contacts with the top end 104a of the leader tape guide member 104, the leader tape 22 is regulated by the leader tape guide member 104 and guided toward the opening 92 of the cassette 6 with the rotation of the supply reel 5. And then the leader tape 22 is drawn out from the cassette 6.

When the whole leader tape 22 is drawn out from the cassette 6, a gap is formed between the roller 93 and the most outside of the magnetic tape 20 wound around the supply reel 5, and thereafter the rotation of the roller 93 is not transmitted to the supply reel 5.

Next, the demounting operation of the cassette 6 will be described.

The cassette 6 is demounted from the supply reel holder 3 through the casette holder. With the upward movement of the cassette 6, the supply reel 5 is lowered by the spring 77 in the cassette 6 and the supply reel 5 is again pressed to the guide ring base 79b. The positioning pins 118a, 118b and the gear 119 are extracted from the openings 61a, 61b and 103, respectively. When the positioning pin 118b is extracted from the opening 61b, the lever 81 is released from the positioning pin 118b to be rotated clockwise around the supporting pin 82 by the spring 86, so that the rack 83 is again engaged with the ratchet 84, to prevent the supply reel 5 from rotating in the direction of the arrow 124.

Next, the take-up reel 7 will be described in detail with reference to FIG. 15 and FIG. 16.

The take-up reel 17 comprises a reel hub 127, a pair of reel flanges 128a, 128b and a pair of hubs 129a, 129b for the leader tape. The reel flanges 128a, 128b are fixed to the circumference of the reel hub 127, spaced from each other. The hubs 129a, 129b for the leader tape are fixed to the circumference of the reel hub 127 adjacent to the reel flanges 128a, 128b, respectively. Circumferences 129a', 129b' of the hubs 129a, 129b are more outside than a circumference 127a of the reel hub 127. A crescent-shaped cut-out portion 130 is formed on the circumference 127a of the reel hub 127. As described below, the clip-like member 29 is contained within the cut-out portion 130. Nearly L-shaped cut-out portions 131a, 131b are formed on the reel flanges 128a, 128b, respectively. Top ends 131a', 131b' of the cut-out portions 131a, 131b are extended into the center of the cut-out portion 130. Parts of the hubs 129a, 129b for the leader tape are cut-out, corresponding to the top ends 131a', 131b' of the cut-out portions 131a, 131b. The distance between the upper hub 129a and the lower hub 129b is slightly larger than the width of the drawing tape and it is slightly smaller than the width of the leader tape 22.

For the drawing wires 27a, 27b, circular grooves 132a, 132b are formed on both ends of the reel hub 127, respectively (FIG. 6).

Next, the take-up reel holder 4 will be described with reference to FIG. 15 and FIG. 16.

A cylindrical portion 135 is formed in the center of the take-up reel holder 4, as shown by the two dots-dash line on FIG. 16. A base 136 for mounting the take-up reel 7 is integrally formed on the lower end of the cylindrical portion 135. When the take-up reel 7 is mounted on the take-up holder 4, the cylindrical member 135 is inserted into the reel hub 127 of the take-up reel 7. An outer circumference 135a of the cylindrical portion 135 contacts closely with an inner circumference of the reel hub 127. The central axis of the take-up reel 7 is coincident with that of the take-up reel holder 135. Three vertical grooves 137 are formed on the circumference 127b of the reel hub 127 at regular angular intevals, extending between the upper face and the lower face of the reel hub 127. Correspondingly with the three vertical grooves 137, three projections 138 are formed on the circumference 135a of the cylindrical member 135 at regular angular intervals, extending between the upper face and the lower face of the cylindrical portion 135. Through the three grooves 137 and projections 138, the reel hub 127 is engaged with the cylindrical portion 135. In that condition, the take-up reel holder 4 and the take-up reel 7 can transmit rotation to each other. A lower surface 127c of the reel hub 127 contacts with a surface 136b of the base 136 of the take-up reel holder 4. A reel shaft 139 of the take-up reel holder 4 is connected directly to a shaft of a motor 140 for driving the take-up reel 7.

Figure 15:
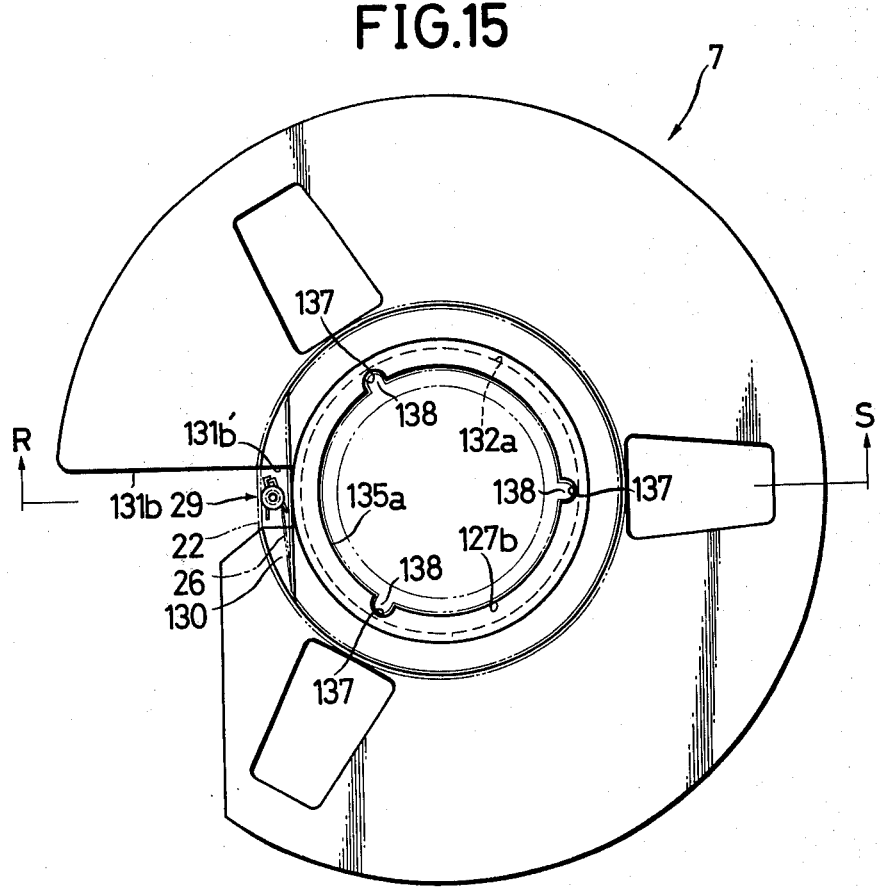
FIG. 15 is a plan view of a take-up reel except its upper reel flange.

As shown by the two dots-dash line on FIG. 15, the drawing tape 26 is wound in the take-up reel 7. A rear end of the drawing tape 26 is fixed to a part of the circumference 127a of the reel hub 127. The drawing tape 26 is wound around the reel hub 127 between the hubs 129a and 129b which act as guide flanges therefor. The length of the drawing tape 26 is designed so that the clip-like member 29 connected to the top end of the drawing tape 26 is positioned nearly at the center of the cut-out portion 130 when the drawing tape 26 is wound several times around the reel hub 127, as shown by the two dots-dash line on FIG. 15. When the drawing wires 27a, 27b are used as the tape drawing member, the rear ends of the drawing wires 27a, 27b are fixed to parts of the circular grooves 132a, 132b. The drawing wires 27a, 27b are wound around the circular grooves 132a, 132b. Also the length of the drawing wires 27a, 27b is designed so that the clip-like member 29 connected to the top ends of the drawing wires 27a, 27b is positioned nearly at the center of the cut-out portion 130 when the drawing wires 27a, 27b are wound several times around the circular grooves 132a, 132b.

Next, the operation of the take-up reel 7 on the loading will be described with reference to FIG. 15 and FIG. 16.

The drawing tape 26 is wound around the reel hub 127 between the hubs 129a and 129b, and the clip-like member 29 connected to the top end of the drawing tape 26 is positioned nearly at the center of the cut-out portion 130. The leader tape 22 connected to the drawing tape 26 through the clip-like member 29, as described below, is wound on the circumferences 129a', 129b' of the hubs 129a, 129b between the reel flanges 128a, 128b. Since the circumferences 129a' and 129b' extend beyond the circumference of the reel hub 127 (FIG. 16), the hubs 129a and 129b are seen to be flanges. Consequently, the leader tape 22 covers arcuately an opening of the cut-out portion 130 containing the clip-like member 29. The leader tape 22 can be smoothly wound in circle around the reel hub 127 without the disturbance of the clip-like member 29. And the magnetic tape 20 following the leader tape 22 is wound around the leader tape 22 wound in advance, between the reel flanges 128a, 128b. Since the leader tape 22 is suitably thick and hard, it can be wound in circle around the reel hub 127, in spite of the crescent cut-out portion 130. Consequently, the magnetic tape 20 can be neatly wound around the leader tape 22 wound in advance, without wrinkling.

Since the cut-out portion 130 is crescently shaped in the above-described take-up reel, the pair of the hubs 129a, 129b is required for circularly winding the leader tape 22. The cut-out portion 130 may be U-shapedly formed on the reel hub 127. At that case, the pair of hubs 129a, 129b can be omitted. The leader tape 22 following the drawing tape 26 is wound on the drawing tape 26 wound in advance. The take-up reel 7 can be simplified in construction.

FIG. 17 to FIG. 22 show the details of the tape connecting device 17.

Figure 18:
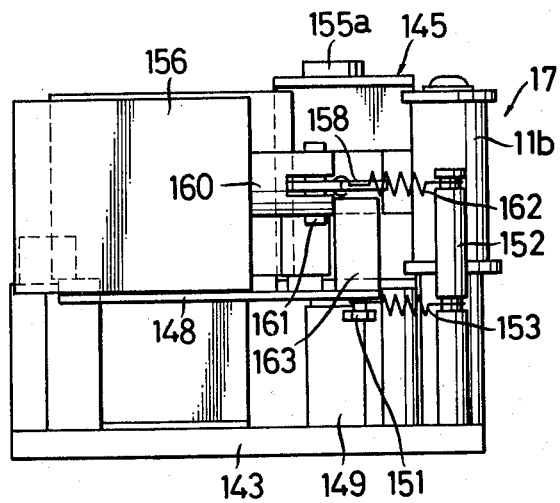
FIG. 18 is an elevational view of the connecting means.
Figure 19:
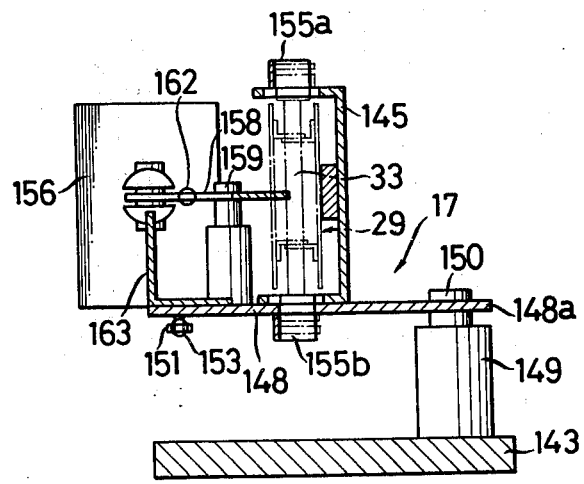
FIG. 19 is a cross-sectional view taken along the lines T-U on FIG. 17.
Figure 20:
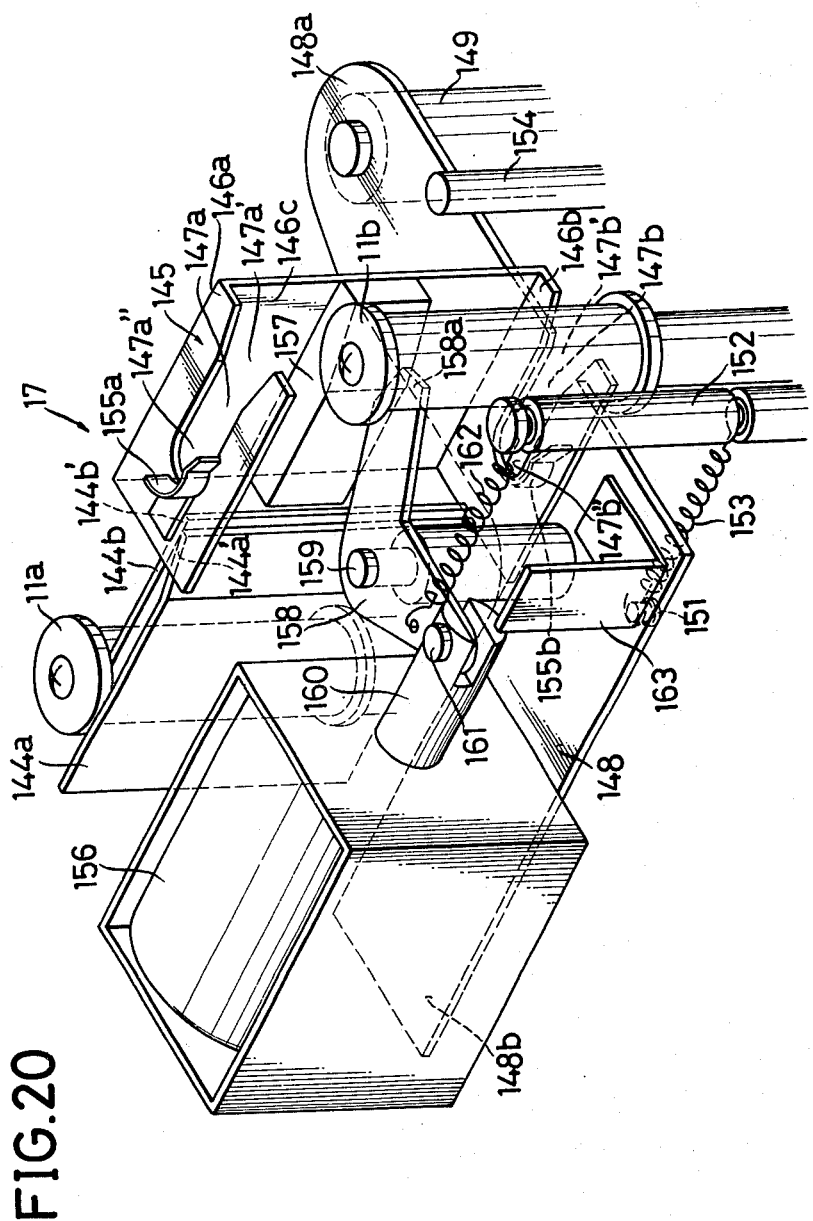
FIG. 20 is a perspective view of important parts of the connecting means.

The tape connecting device 17 is supported on a base plate 143 fixed to the chassis 1 of the VTR (FIG. 17 to FIG. 19). The tape guide members 11a and 11b are fixed at the both ends of the base plate 143, respectively, between which the required tape connection and disconnection are performed. A pair of leader tape guide plates 144a, 144b is arranged, pointing to the tape guide member 11 from the tape guide member 11a near the cassette 6. Top ends 144a', 144b' of the leader tape guide plates 144a, 144b are positioned at the midway between the tape guide member 11a and 11b. The leader tape guide plates 144a, 144b are slightly projected into the space between an upper wall 146a and a lower wall 146b of a nearly U-shaped holder 145 for the clip-like member 29. The distance between the upper wall 146a and the lower wall 146b is nearly the same as the distance between the rollers 38a and 38b of the clip-like member 29. A pair of cut-out portions 147a, 147b are formed on the upper walls 146a, 146b of the holder 145, pointing to the tape guide member 11a from the tape guide member 11b, respectively. The width of the cut-out portions 147a, 147b is nearly the same as the diameter of the rollers 38a, 38b of the clip-like member 29. One ends 147a', 147b' of the cut-out portions 147a, 147b are tapered, and the other ends 147a'', 147b'' are round. A pair of nearly arcuate springs 155a, 155b is attached to the upper wall 146a and the lower wall 146b adjacent to the other ends 147a'', 147b'' of the cut-out portions 147a, 147b. The arcuate springs 155a, 155b catches elastically the rollers 38a, 38b of the clip-like member 29 in cooperation with the cut-out portions 147a, 147b when the clip-like member 29 is led to the other ends 147a'', 147b'' of the cut-out portions 147a, 147b. The holder 145 for the clip-like member 29 is fixed on a nearly L-shaped movable base 148 one end of which is rotatably supported at a pin 150 on a post 149 fixed to the base plate 143. A spring 153 is extended between a pin 151 fixed to the lower surface of the movable base 148 and the center of a post 152 adjacent to the tape guide member 11b, to urge the movable base 148 toward the tape guide member 11b. The movable base 148 is stopped by a stopper pin 154 fixed to the base plate 143. A plunger solenoid 156 is attached to another end 148b of the movable base 148. A support block 157 for the clip-like member 29 is fixed to the center of a vertical wall 146c of the holder 145. Opposite to the support block 157, an L-shaped support lever 158 for the clip-like member 29 is supported rotatably in a horizontal plane, by a pin 159. One end 158a of the support lever 158 is able to contact with the rear end 31b of the clip lever 31 of the clip-like member 29. Another end 158b of the support lever 158 is connected to a top end of a plunger 160 of the plunger solenoid 156 through a connecting pin 161. A spring 162 for restoring the plunger 160 is extended between the end 158b of the support lever 158 and a top end of the post 152. The support lever 158 is normally urged anti-clockwise around the pin 159 by the spring 162 (FIG. 17). The plunger 160 and therefore the support lever 158 are stopped by a nearly L-shaped stopper plate 163 fixed to the movable base 148. A support member 164 for the sensing means $S_1$, $S_2$ is fixed at the end of the base plate 143.

Next, the loading and unloading operations of the magnetic tape 20 will be described with respect to the case that the drawing tape 26 is used as the tape drawing member. The loading operation begins with the pushing of a not shown loading button. At the beginning of the loading operation, the drawing tape 26 is drawn out from the take-up reel, in advance. And the clip-like member 29 connected to the top end of the drawing tape 26 is caught by the tape connecting device 17.

The rollers 38a, 38b of the clip-like member 29 is inserted in the cut-out portions 147a, 147b of the holder 14, as shown by the dot-dash line in FIG. 19. At the ends 147a'', 147b'' of the cut-out portions 147a, 147b, the rollers 36a, 36b are elastically held by the arcuate springs 155a, 155b.

The clip-like member 29 is nipped between the support block 157 and the support lever 158 by means of the spring 162 and therefore the top of the clip-like member 29 is opened (FIG. 22). The rear end 31b of the clip lever 31 is pushed by the end 158a of the support lever 158 and so the clip lever 31 is slightly rotated anti-clockwise around the supporting axis 33 against the spring 34, relative to the clip base 30 in contact with the support block 157. The catching members 30a, 31a are separated from each other to form a mouth for the leader tape 22 (FIG. 22).

The loading operation of the magnetic tape 20 will be described with reference to FIG. 23A-FIG. 23I showing the sequence control by the sensing means $S_1$, $S_2$ and $S_3$.

Figure 23A:
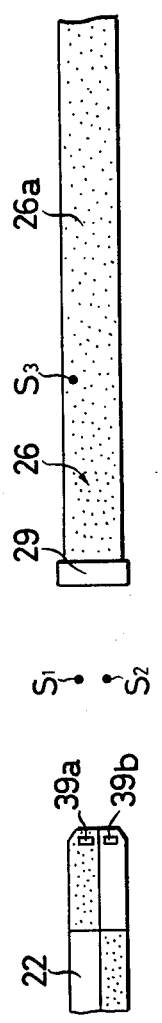
Figure 23B:
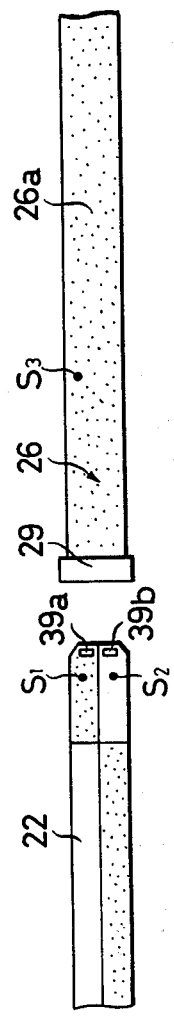

Before the loading, the sensing means $S_3$ detects the opaque 26a of the drawing tape 26 to generate the output O, and the sensing means $S_1$, $S_2$ generates the output 1 (FIG. 23A). With the pushing of the loading button, the roller 93 for drawing out the leader tape 22 is rotated in the cassette 6 to draw out the leader tape 22 to the tape path 10 through the opening 92 of the cassette 6. Immediately after the top end 22c of the leader tape 22 is led out of the cassette 6, it is guided into the holder 145 by the pair of the leader tape guide plates 144a, 144b. The top end 22c of the leader tape 22 passes through the mouth between the catching members 30a and 31a and then it is led into contact with the stopper members 32a, 32b of the clip-like member 29. Immediately before the top end 22c of the leader tape 22 is led into the tape connecting device 17, the sensing means $S_1$ detects the opaque 22a of the end 22c of the leader tape 22 to generate the output 0 (FIG. 23B). At that time, the outputs of the sensing means $S_1$, $S_2$ are O, 1 and 0, respectively. With such the outputs, the cassette holder for the cassette 6 is locked. In other words, the cassette holder cannot be ejected.

Figure 23C:
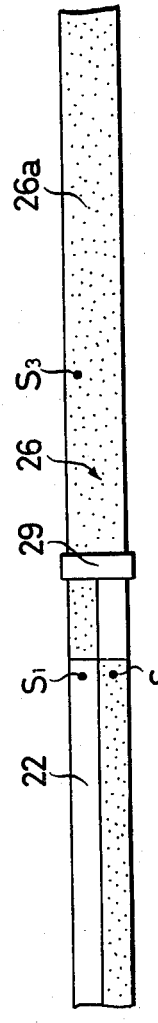

Immediately before the top end 22c of the leader tape 22 contacts with the stopper members 32a, 32b of the clip-like member 29, the sensing means $S_1$ detects the top of the transparent part of the leader tape 22 to generate the output 1 and concurrently the sensing means $S_2$ detects the top of the lower opaque 22b of the leader tape 22 to generate the output 0. At that time, the outputs of sensing means $S_1$, $S_2$ and $S_3$ are 1, 0, and 0 (FIG. 23c). With such the outputs, the plunger solenoid 156 is energized to pull the plunger 160 against the spring 162. At the same time or a little later, the motor 140 begins to be rotated.

With the energization of the plunger solenoid 156, the support lever 158 is rotated clockwise around the pin 159 and the mouth of the clip-like member 29 is closed (FIG. 21). The clip lever 31 is urged clockwise around the supporting axis 33 by the spring 34 and the top of the leader tape 22 is nipped between the catching members 30a and 31a. The projections 35a, 35b of the catching members 30a, 31a are engaged with the openings 39a, 39b of the top end 22c of the leader tape 22. Consequently, the leader tape 22 is automatically connected to the drawing tape 26 through the clip-like member 29, by the tape connecting device 17.

Concurrently with the tape connection or a little later, the motor 140 drives the take-up reel holder 4. The take-up reel 7 is rotated anticlockwise in FIG. 1 and it draws out the leader tape 22 at the same speed as the roller 93 in the cassette 6. The leader tape 22 is transported on the tape path 10, following the drawing tape 26.

The leader tape 22 is threaded through the tape guide members 11a, 11b, 11c, the capstan 8a, the tape guide member 11d, the guide member 12a and the tape guide pin 13a, and it is wound on the 180° portion of the durm 2. Then it is threaded through the tape guide pin 13b, the guide member 12b, the tape guide member 11e, the capstan 8b and the tape guide members 11f, 11g, and then it is accumulated by the take-up reel 7. The magnetic tape 20 connected to the leader tape 22 is transported on the tape path 10, following the leader tape 22. In such a manner, the magnetic tape 20 is loaded on the tape path 10.

When the drawing wires 27a, 27b are used as the drawing member, they are transported on the tape path 40 defined by the wire guide members 41a-41f, while the leader tape 22 and the magnetic tape 20 are transported on the tape path 10. With the end of the loading operation, the motor 140 stops automatically and so the take-up reel 7 stops.

Figure 23D:
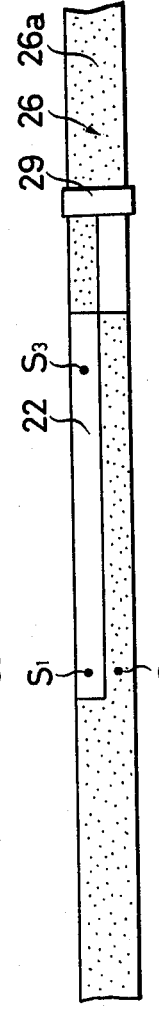
Figure 23E:
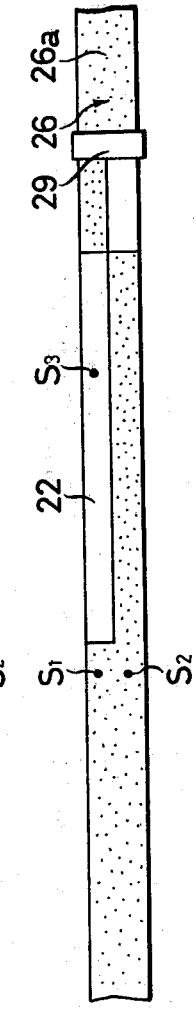
Figure 23F:
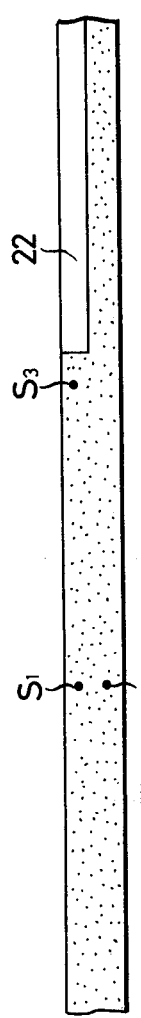
Figure 23G:

In the above-described loading operation, the sensing means $S_1$, $S_2$ and $S_3$ detects the tapes in order of FIG. 23D, FIG. 23E and FIG. 23F. When the mode of FIG. 23E is changed into the mode of FIG. 23F, the loading operation is finished and the locking of the cassette holder is released. In the mode of FIG. 23D, the sensing means $S_1$, $S_2$ and $S_3$ detect the leader tape 22, when the outputs of the sensing means $S_1$, $S_3$ are 1 and the output of the sensing means $S_2$ is 0. In the mode of FIG. 23E, the sensing means $S_1$, $S_2$ detect the top end of the magnetic tape 20 to generate the output 0, and the sensing means $S_3$ detects the upper half of the leader tape 22 to generate the output 1. And in the mode of FIG. 23F, all of the sensing means $S_1$, $S_2$, $S_3$ detect the magnetic tape 20 to generate the output 0. At that time, the magnetic tape 20 is perfectly loaded on the tape path 10, when the top end of the magnetic tape 20 reaches near the take-up reel 7.

The plunger solenoid 156 can be energized for a required time by any timer. However, it may be deenergized by any one mode of FIG. 23D, FIG. 23E and FIG. 23F.

Moreover, the sensing means $S_1$, $S_2$, $S_3$ function as a safety device. For instance, when the leader tape 22 is cut during the loading operation, as shown on FIG. 23G, or when the leader tape 22 fails to be caught by the clip-like member 29, the output of the sensing means $S_1$ is 0 and the outputs of the sensing means $S_2$, $S_3$ are 1. With such the outputs, the roller 93 and the motor 140 is automatically stopped to cease the loading operation. Misoperation may be indicated to an operater by any lamp.

Next, the unloading operation will be described.

With the pushing of the unloading button, the motor 116 begins to drive the supply reel holder 3 and so the supply reel 5 is rotated clockwise in FIG. 1. The magnetic tape 20 drawn out on the tape path 10 is accumulated by the supply reel 5. Consequently, the leader tape 22 is drawn out from the take-up reel 7 and it is transported on the tape path 10 in the direction opposite to the direction on the loading. Following the leader tape 22, the drawing tape 26 is drawn out from the take-up reel 7, and it is transported on the tape path 10. Accordingly, the clip-like member 29 connected to the top end of the drawing tape 26 reaches the tape connecting device 17.

Since the plunger solenoid 156 has already been deenergized, the support lever 158 remains restored by the spring 162, as shown on FIG. 22. The clip-like member 29 is led into the cut-out portions 147a, 147b of the tape connecting device 17. The rollers 36a, 36b of the clip-like member 29 is caught by the arcuate springs 155a, 155b, as shown by the dot-dash line on FIG. 19. Since the clip-like member 29 pushes the holder 145 with the drawing of the leader tape 22, the holder 145 is somewhat rotated clockwise around the pin 150 through the movable base 148 against the spring 153 (FIG. 17). By the function of the spring 153, the clip-like member 29 is stopped in an extremely small shock.

The clip base 30 and the clip lever 31 of the clip-like member 29 are again nipped between the support block 157 and the support lever 158, by the function of the spring 162. Therefore, the top of the clip-like member 29 is opened. The catching members 30a, 31a are separated from each other, so that the openings 39a, 39b of the leader tape 22 are released from the projections 35a, 35b of the catching members 30a, 31a.

As soon as the top of the clip-like member 29 is opened, the leader tape 22 is automatically disconnected from the drawing tape 26. The drawing tape 26 is stopped by the holder 145 of the tape connecting device 17, while the leader tape 22 is accumulated by the supply reel 5. When the whole leader tape 22 is accumulated by the supply reel 5, the unloading operation is ended. The motor 116, the supply reel holder 4 and therefore the supply reel 5 are stopped.

The unloading operation begins in the mode of FIG. 23F and ends in the mode of FIG. 23A.

The required recording or reproducing begins in the above described loading condition. With the pushing of the recording or reproducing button, the motor 140 drives the take-up reel 4 at a constant speed. The take-up reel 7 is rotated anti-clockwise in FIG. 1 at the constant speed. At the same time, the pinch rollers 9a, 9b is pressed to the capstans 8a, 8b. The magnetic tape 20 is transported on the tape path 10 from the supply reel 5 to the take-up reel 7, at a constant speed. It is scanned by the rotary heads 2a, 2b to perform the required recording or reproducing.

Next, the switching mode of the sensing means $S_1$, $S_2$, $S_3$ will be described, when the tape is forwardly running in the recording, the reproducing or the fast forwarding operation.

In such forward runnings, all of the sensing means $S_1$, $S_2$, $S_3$ detect the opaque 20a of the magnetic tape 20 to generate the output 0, as shown on FIG. 23F.

Figure 23H:
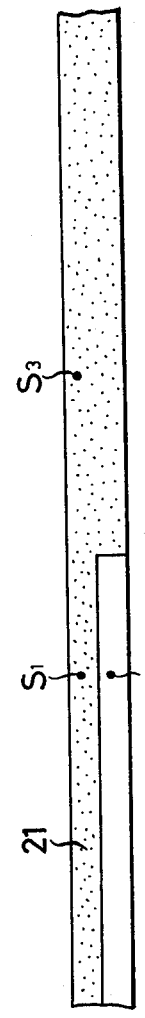

As soon as the trailer tape 21 is drawn out from the supply reel 5, following the magnetic tape 20, the switching mode of FIG. 23F is changed into the switching mode of FIG. 23H. At that time, the motor 140, the take-up reel holder 4 and therefore the take-up reel 7 stop. In the switching mode of FIG. 23H, the sensing means $S_1$ detects the opaque 21a of the trailer tape 21 and the sensing means $S_3$ detects the magnetic tape 20, to generate the output 0, while the sensing means $S_2$ detects the transparent part of the trailer tape 21 to generate the output 1. Moreover, all of the buttons except the rewinding button are locked in the switching mode of FIG. 23H.

The switching mode of the sensing means $S_1$, $S_2$, $S_3$ will be described, when the tape is reversely running in the rewinding operation.

The tape begins to run reversely in the switching mode of FIG. 23F in which all of the sensing means $S_1$, $S_2$, $S_3$ generates the output 0, or in the switching mode of FIG. 23H in which the sensing means $S_1$ and $S_2$ generate the output 0 and the sensing means $S_3$ generates the output 1. When the whole magnetic tape 20 is accumulated by the supply reel 5, the switching mode of FIG. 23E is obtained in which the outputs of the sensing means $S_1$, $S_2$ are 0 and the output of the sensing means $S_3$ is 1. Accordingly, the supply reel 5 is stopped. Then, the take-up reel 7 is somewhat rotated and so the switching mode of FIG. 23F is obtained in which all of the sensing means $S_1$, $S_2$, $S_3$ generate the output 0. Consequently, the take-up reel 7 is stopped and the tape rewinding operation is completed. The reason why the take-up reel 7 is somewhat rotated to draw out the magnetic tape 20, is to compensate the overrunning of the magnetic tape 20.

Figure 23I:

When the magentic tape 20 is unexpectedly cut off in the tape forward running or the tape reverse running, the switching mode of FIG. 23I is obtained in which the outputs of the sensing means $S_1$, $S_2$, $S_3$ are 1. Consequently, the tape running is stopped for safety. That is indicated to the operater by a lamp.

It will be apparent from the foregoing that the leader tape can be orderly wound in circle around the drawing tape or the drawing wires wound in advance without the disturbance of the connecting means attached to the drawing tape or the drawing wires and consequently the magnetic tape can be neatly wound around the take-up reel without the swelling, in the reel assembly according to this invention.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of this invention, as defined in the appended claims.

What is claimed is:

1. A reel assembly comprising a pair of tape-drawing wires with a required length, a connecting means for connecting said tape-drawing wires to another tape-like member, said connecting means being attached to one end of said tape-drawing wires, a reel hub, a pair of circular grooves formed on said reel hub to receive said tape-drawing wires wound thereon, a pair of flanges fixed to both ends of said reel hub and at least one cut-out portion formed on the circumference of said reel hub, said connecting means being led into said cutout portion when said tape-drawing wires are wound on said circular grooves and said tape-like member connected to said tape-drawing wires through said connecting means is wound around said reel hub, whereby said tape-like member can be orderly wound in circle around said reel hub.

2. A reel assembly according to claim 1 wherein said pair of circular grooves is formed on opposite ends of said reel hub.

3. A reel assembly comprising a reel hub having a first diameter and a first height; a first pair of flange members fixed to opposite ends of said reel hub, said first pair of flange members having a second diameter and a second height, said second diameter being greater than said first diameter and said second height being greater than said first height; a second pair of flange members fixed to opposite ends of and overlying said first pair of flange members so as to be spaced apart from each other by said second height, said second pair of flange members having a third diameter greater than said second diameter; a drawing tape having one end attached to said reel hub and a second end secured to connecting means for gripping a tape member and for winding said tape member onto said reel assembly, said drawing tape having a width less than said second height so as to be wound about said reel hub when said reel hub is rotated, said first pair of flange members guiding said drawing tape therebetween; said first pair of flanges further serving as a hub for at least a portion of said tape member gripped by said connecting means, said portion of said tape member having a width greater than said first height so as to be wound about said first pair of flange members when said reel hub is rotated, said second pair of flange members guiding said portion of said tape member therebetween; and a cut-out portion formed on the periphery of said reel hub for receiving said connecting means when said drawing tape is wound about said reel hub so as to enable said portion of said tape member to circularly circumscribe said connecting means in said cutout portion when said portion is wound about said first pair of flange members.

4. A reel assembly according to claim 3, wherein a pair of cut-out portions is formed in said second pair of flange members for guiding said connecting means smoothly into said cut-out portion of said reel hub.

* * * * *